United States Patent
Berger

(10) Patent No.: US 10,244,827 B1
(45) Date of Patent: Apr. 2, 2019

(54) SAFETY CAR SEAT TIGHTENING DEVICE AND SEAT WEDGE FOR USE IN INSTALLING SAFETY CAR SEATS

(71) Applicant: Stephen C. Berger, Naples, FL (US)

(72) Inventor: Stephen C. Berger, Naples, FL (US)

(*) Notice: Subject to any disclaimer, the term of this patent is extended or adjusted under 35 U.S.C. 154(b) by 0 days.

(21) Appl. No.: 15/674,668

(22) Filed: Aug. 11, 2017

Related U.S. Application Data

(63) Continuation-in-part of application No. 15/609,363, filed on May 31, 2017.

(51) Int. Cl.
*A44B 11/06* (2006.01)
*B60N 2/28* (2006.01)

(52) U.S. Cl.
CPC .............. *A44B 11/065* (2013.01); *B60N 2/28* (2013.01)

(58) Field of Classification Search
CPC ... A44B 11/065; A44B 11/125; B60N 2/2887; Y10T 24/2164
USPC ...... 294/31.2, 32, 39, 27.1, 81.1, 67.1–67.5; 410/129–142
See application file for complete search history.

(56) References Cited

U.S. PATENT DOCUMENTS

| | | | |
|---|---|---|---|
| 4,604,773 A | 8/1986 | Weber et al. | |
| 5,810,435 A * | 9/1998 | Surot | B60N 2/2806 297/216.11 |
| 6,024,408 A | 2/2000 | Bello et al. | |
| 6,047,451 A | 4/2000 | Berger et al. | |
| 6,540,293 B1 * | 4/2003 | Quackenbush | B60N 2/2806 297/250.1 |
| 7,029,068 B2 * | 4/2006 | Yoshida | B60N 2/2806 297/250.1 |
| 8,434,821 B2 | 5/2013 | Gibree | |
| 8,444,222 B2 | 5/2013 | Buckingham et al. | |
| 9,499,074 B2 | 11/2016 | Strong et al. | |
| 2010/0156165 A1 | 6/2010 | Vais | |

* cited by examiner

*Primary Examiner* — Robert Sandy
(74) *Attorney, Agent, or Firm* — Edward M. Livingston, Esq.; Bryan L. Loeffler, Esq.; Livingston Loeffler, P.A.

(57) ABSTRACT

A tightening device (1) for use in installing an infant or child safety car seat in a motor vehicle and a wedge (16) having a recessed area or central cutout created by a cross-member (22) connecting two triangular-shaped side panels (17) used to expose an anchoring bracket (11) located within a vehicle seat.

6 Claims, 4 Drawing Sheets

SAFETY CAR SEAT TIGHTENING DEVICE AND SEAT WEDGE FOR USE IN INSTALLING SAFETY CAR SEATS

CROSS-REFERENCE TO RELATED APPLICATIONS

This application is continuation-in-part of U.S. patent application Ser. No. 15/609,363 filed on May 31, 2017, which is currently pending. The patent application identified above is incorporated herein by reference in its entirety to provide continuity of disclosure.

FIELD OF THE INVENTION

This invention relates to the installation of child and infant safety car seats, and more particularly, to devices and methods for securely attaching a child or infant safety car seat, or seat base, to latch anchors in a vehicle.

BACKGROUND OF THE INVENTION

Child safety seats are too often improperly installed in vehicles, thereby posing serious physical risks to children. The preferred method of securing a safety car seat in a vehicle is to use a LATCH (Lower Anchors and Tethers for Children) anchor system, which was developed to simplify installation of child safety seats. This system uses attachment straps designed for the child safety seat (as opposed to seat belts) to secure the child safety seat to anchors that are permanently attached to the vehicle. The anchors are steel rings or loops located within the crack of a seat. The attachment straps have hooks or other fittings that attach to the anchors. While the LATCH system is more effective than using a conventional seat belt, child safety car seats are still difficult to install for at least two reasons.

The first reason is the fact that anchors are sometimes buried between the automobile seat cushions, and are not easily visible. This can make it difficult to maneuver a hook onto an anchor and/or to release the hook from the anchor.

The second reason, and the more dangerous, is the removal of slack in a loose attachment strap. Slack in the attachment strap decreases the effectiveness of the attachment strap's ability to secure and retain the child safety seat in place within the vehicle. For many individual's it is extremely difficult to tighten the attachment strap. As a result, every year many children are needlessly injured or killed during otherwise minor vehicular accidents because of the incorrect installation of the child's safety seat.

Therefore, a need exists for a system and devices for assisting in the installation of a child safety seat with first, the securement of the attachment strap to the vehicle's anchors and second the tightening of the attachment strap.

SUMMARY OF THE INVENTION

The primary object of the present invention is to provide a system and devices for assisting in the installation of a child safety seat with first, the securement of the attachment strap to the vehicle's anchors and second the tightening of the attachment strap.

The present invention fulfills the above and other objects by providing a tightening device for use in installing an infant or child safety car seat in a motor vehicle. The tightening device has a preferably rectangular or trapezoidal-shaped frame having four elongated members that make up a base member a top member and two side members. A ratchet is attached to one of the side members. The frame is placed into a safety seat in a manner that allows a user to press downward, thereby pressing the child safety seat into the seat of the motor vehicle. An attachment strap has hooks located on opposing ends that are secured to anchors located within the vehicle's seat, as described below. A fixed end of the attachment strap is fixedly attached to a hook. The opposing end of the attachment strap is a sliding end having a locking buckle located thereon to allow the attachment strap to be tightened and loosened. The sliding end of the attachment strap is attached to an anchor and to the ratchet and then tightened as the frame is pushed downward on the child safety seat.

The frame may have a planar base member that is pushed downward into the child safety seat and/or notched side members that engage horizontal posts extending from each side of the child safety seat or a rod that is inserted through apertures located on the child safety seat. Ends of the rod extend though both sides of the child safety seat providing a support for the notched side members to engage while downward pressure is being applied to the child safety seat.

An additional feature of the present system is a triangular-shaped wedge that having a recessed area or central cutout created by a cross-member connecting two triangular-shaped side panels. The wedge may be placed in-between the automobile seat cushions to separate the seat cushions, thereby exposing the anchoring bracket which extends though the center of the wedge. The hooks located on the attachment strap may then be easily attached to the exposed anchor brackets.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
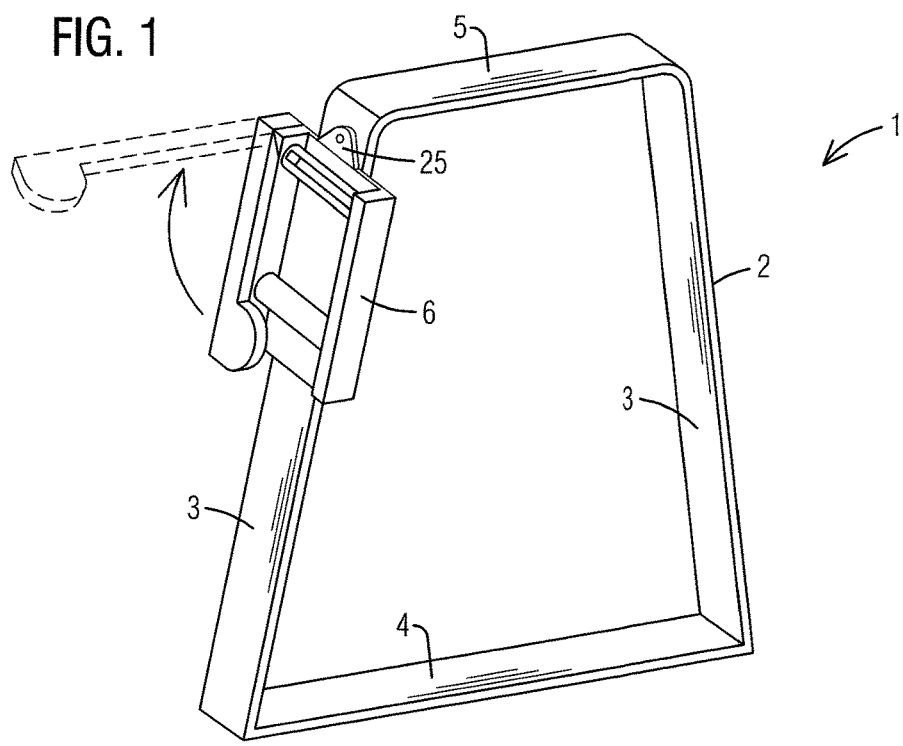
FIG. 1 is a perspective side view of safety car seat tightening device of the present invention.
Figure 2:
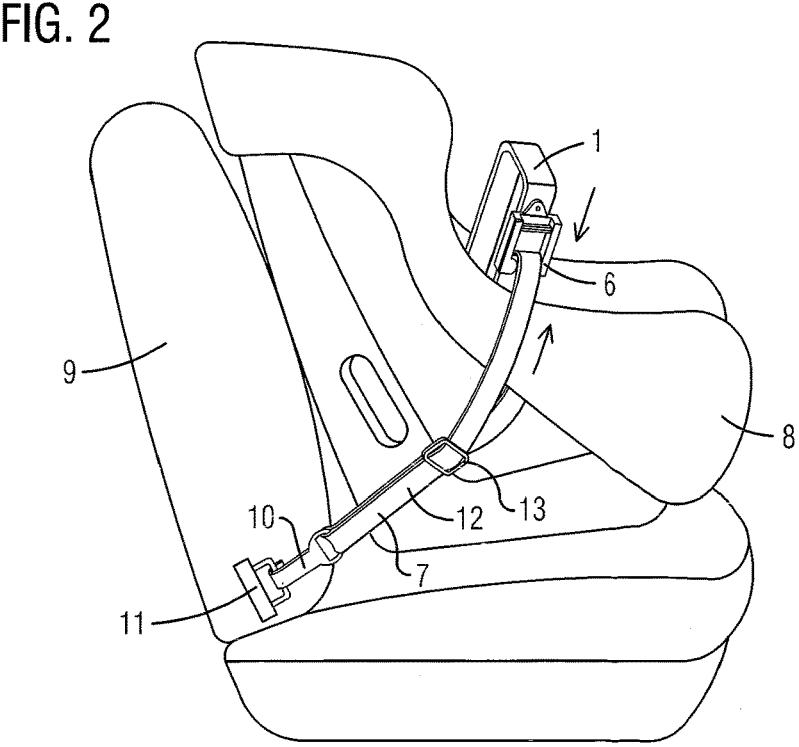
FIG. 2 is a left side view of a safety car seat tightening device of the present invention in use.
Figure 7:
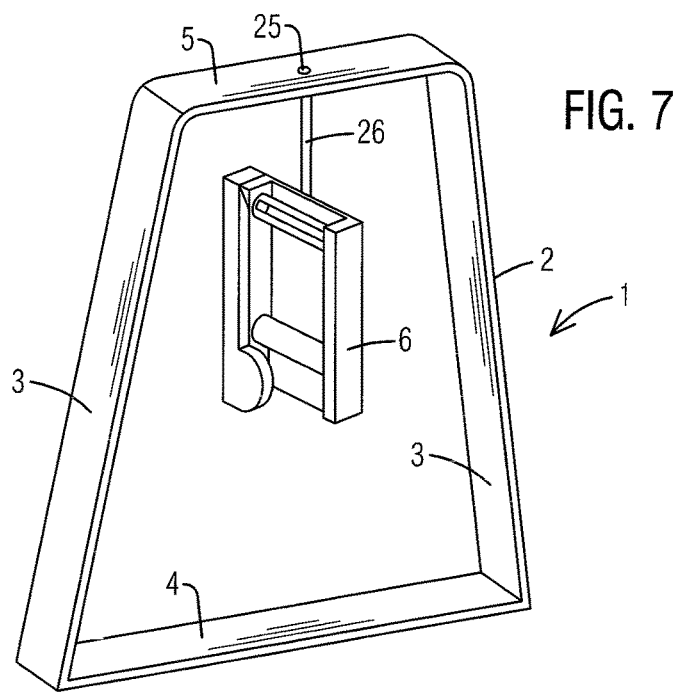
FIG. 7 is a perspective side view of safety car seat tightening device of the present invention wherein the ratchet is attached to the top member via a pivot point.

For purposes of describing the preferred embodiment, the terminology used in reference to the numbered accessories in the drawings is as follows:

1. tightening device, generally
2. frame
3. vertical member
4. base member
5. top member
6. ratchet
7. attachment strap
8. car safety seat
9. vehicle seat
10. hook
11. anchor
12. sliding end
13. locking buckle
14. notched end
15. rod
16. seat wedge, generally
17. side panel
18. bottom surface
19. top surface
20. rear surface
21. vehicle seat crack
22. cross-member
23. bottom seat cushion
24. rear seat cushion
25. pivot point
26. extension With reference to FIGS. 1 and 2, a perspective side view of safety car seat tightening device 1 of the present invention and a left side view of a safety car seat tightening device of the present invention in use, respectively, are illustrated. The tightening device 1 of the present invention comprises a frame 2 having at least one vertical member 3 extending upward from a base member 4. As illustrated herein, the frame 2 is a trapezoidal-shaped frame 4 having a base member 4, a top member 5 and two vertical members 3 or side members. A ratchet 6 is attached to at least one of the vertical members 3 in an elevated position. The ratchet 6 is preferably pivotally attached to the frame 2 via a pivot point 25 to allow the ratchet 6 to be angled in relation to an attachment strap 7 being tightened. The ratchet 6 may be pivotally attached to the vertical members 3, as illustrated in FIG. 1, and/or to the top member 4 via a pivot point 25, as illustrated in FIG. 7. The frame 2 may have multiple shapes, such as a rectangular shape, square shape, an I shape or equivalent shape that allows a downward pressure to be applied to the car safety seat 8 while maintaining the ratchet 6 in an elevated position.

To use the safety car seat tightening device 1, as illustrated in FIG. 2, the frame 2 is placed into a safety car seat 8 in a manner that allows a user to press downward, thereby pressing the child safety car seat 8 into a motor vehicle seat 9. An attachment strap 7 has hooks 10 located on opposing ends that are secured to anchors 11 located within the vehicle seat 9. A fixed end of the attachment strap 7 may be fixedly attached to a hook 10. The opposing end of the attachment strap 7 is a sliding end 12 having a locking buckle 13 located thereon to allow the attachment strap 7 to be tightened and loosened. The sliding end 12 of the attachment strap 7 is attached to the ratchet 6 and then tightened as the frame 2 is pushed downward into the child safety car seat 8.

Figure 3:
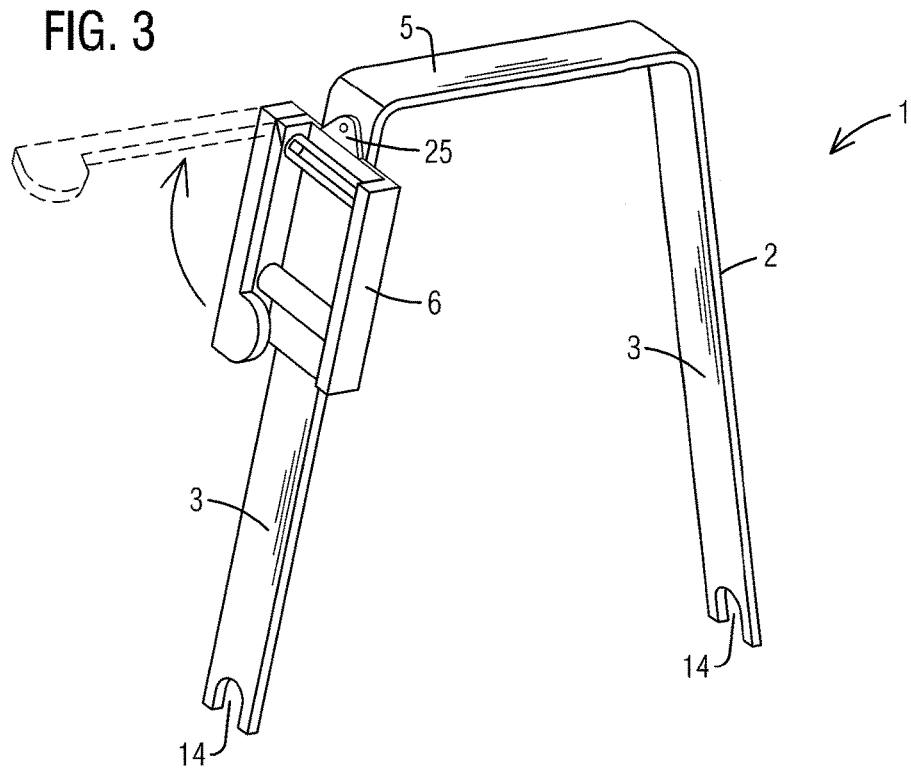
FIG. 3 is a perspective side view of safety car seat tightening device of the present invention having notched side members.
Figure 4:
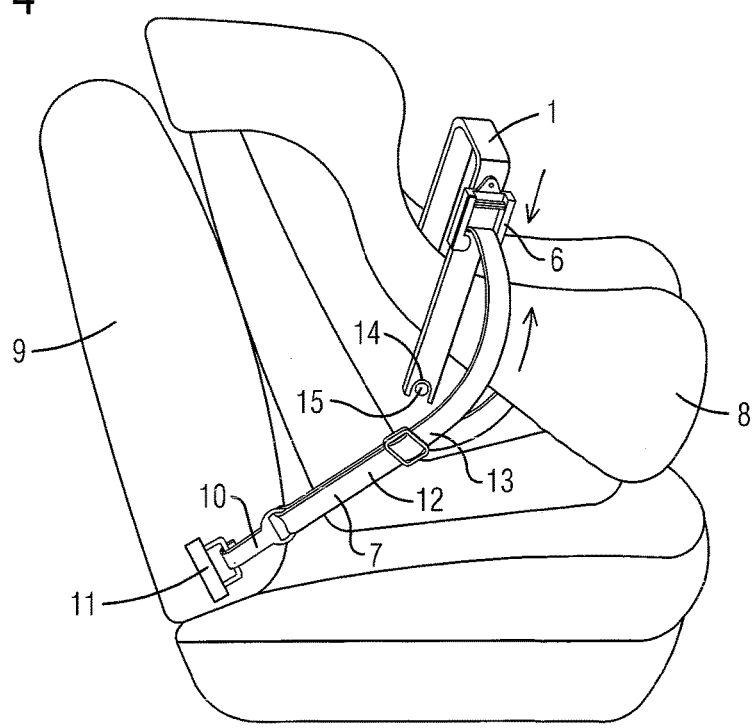
FIG. 4 is a left side view of a safety car seat tightening device of the present invention having notched side members and in use.

With reference to FIGS. 3 and 4, a perspective side view of safety car seat tightening device 1 of the present invention having notched side members and a left side view of a safety car seat tightening device of the present invention having notched side members and in use, respectively, are illustrated. As illustrated herein, the frame 2 comprises a top member 5 and two vertical members 3 or side members. A ratchet 6 is attached to at least one of the vertical members 3 in an elevated position. The ratchet 6 is preferably pivotally attached to the frame 2 via a pivot point 25 to allow the ratchet 6 to be angled in relation to an attachment strap 7 being tightened. The two vertical members 3 have notched ends 14 that engage at least one rod 15 extending from each side of the child safety seat 8, as illustrated in FIG. 4. Ends of the rod 15 extend though both sides of the child safety car seat 8 providing a support for the notched ends 14 of the vertical member 3 to engage while downward pressure is being applied to the child safety car seat 8.

Figure 5:
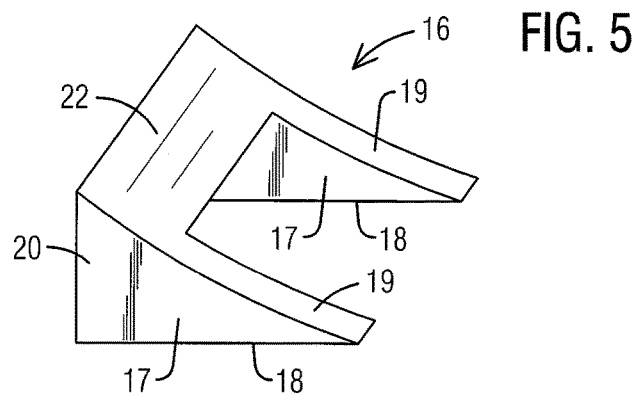
FIG. 5 is a perspective side view of a seat wedge of the present invention.
Figure 6:
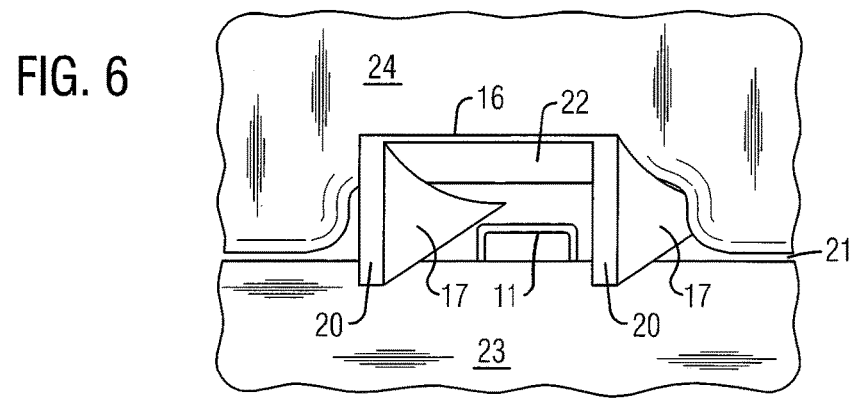
FIG. 6 is a perspective side view of a seat wedge of the present invention in use.

With reference to FIGS. 5 and 6, a perspective side views of a seat wedge 16 of the present invention and a seat wedge 16 in use, respectively, are illustrated. The seat wedge 16 comprises two substantially triangular-shaped side panels 17 each having a bottom surface 18, top surface 19 and rear surface 20. The top surface 19 is preferably curved to allow the wedge 16 to be easily inserted in to the crack 21 of the vehicle seat 9. The two side panels 17 are connected by a cross-member 22 attached proximate to or directly to the top surfaces 19 of each side panel 17.

The wedge 16 may be placed in-between a bottom seat cushion 23 and rear seat cushion 24 to separate the seat cushions 23, 24, thereby exposing the bracket anchors 11 located in the crack 21 of the vehicle seat 9. The anchor 11 extends between the side panels 17 of the wedge 16, as illustrated in FIG. 6. A hook 10 located on the attachment strap 7 may then be easily attached to the exposed anchor 11.

With reference to FIG. 7, a perspective side view of safety car seat tightening device 1 of the present invention wherein a ratchet 6 is attached to the top member 4 via a pivot point 25 is illustrated. The ratchet 6 may be attached directly to the frame 2 or top member 4 via the pivot point 25 and/or to the pivot point 25 via an extension 26 that allows the ratchet 6 to be rotated and angled into a desired position. The extension 26 may be a rigid or non-rigid and flexible.

Figure 8:
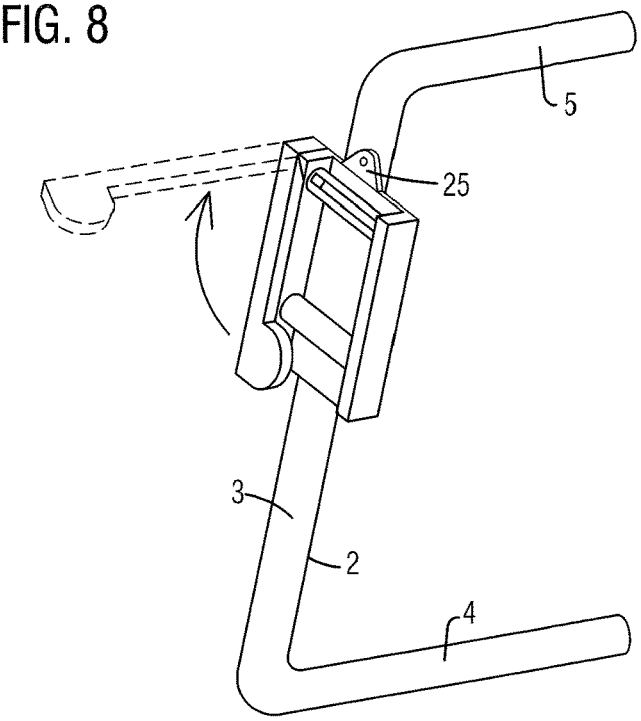
FIG. 8 is a perspective side view of safety car seat tightening device of the present invention having a single vertical member.

With reference to FIG. 8, a perspective side view of safety car seat tightening device 1 of the present invention having a single vertical member 3 is illustrated. The tightening device 1 of the present invention comprises a frame 2 having at least one vertical member 3 extending upward from a base member 4. As illustrated herein, the frame 2 is a partial trapezoidal-shaped frame 4 having a base member 4, a top member 5 and one vertical member 3 or side member, which is in an angled position in relation to the base member 4 and top member 5. A ratchet 6 is attached to the vertical member 3 in an elevated position. The ratchet 6 is preferably pivotally attached to the frame 2 via a pivot point 25 to allow the ratchet 6 to be angled in relation to an attachment strap 7 being tightened. The ratchet 6 may be pivotally attached to the vertical members 3. As illustrated herein, the frame 2 is constructed from a tubular material. This tubular material may be used in any of the embodiments of the present invention.

Figure 9:
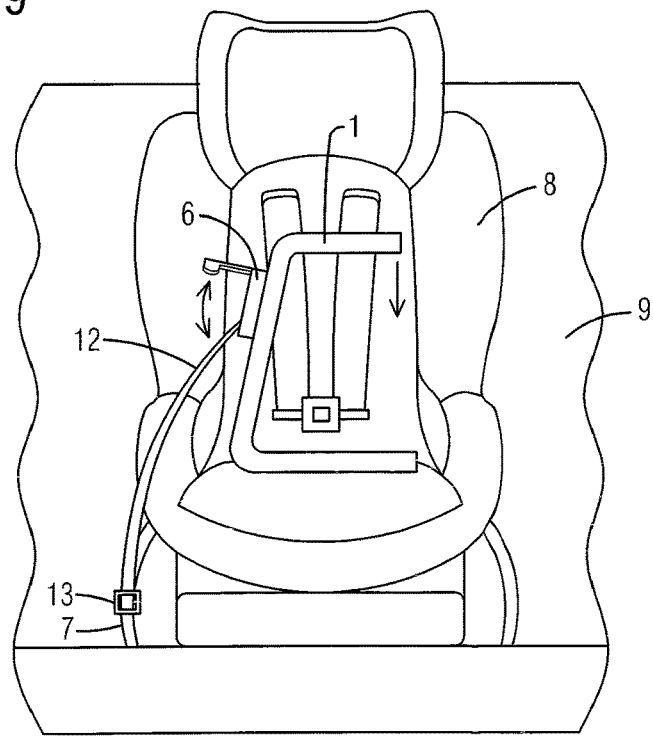
FIG. 9 is a front view of a safety car seat tightening device of the present invention in use.

To use the safety car seat tightening device 1, as illustrated in FIG. 9, the frame 2 is placed into a safety car seat 8 in a manner that allows a user to press downward, thereby pressing the child safety car seat 8 into a motor vehicle seat 9. An attachment strap 7 has hooks 10 located on opposing ends that are secured to anchors 11 located within the vehicle seat 9, as illustrated in FIG. 2. A fixed end of the attachment strap 7 may be fixedly attached to a hook 10. The opposing end of the attachment strap 7 is a sliding end 12 having a locking buckle 13 located thereon to allow the attachment strap 7 to be tightened and loosened. The sliding end 12 of the attachment strap 7 is attached to the ratchet 6 and then tightened as the frame 2 is pushed downward into the child safety car seat 8.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A tightening device for use in installing child safety car seats comprising:

a frame having a top member connected to at least one vertical member extending downward to a base member wherein the top member and the base member are both in horizontal positions in relation to the at least one vertical member;

said base member being located directly below said top member;

a ratchet attached to the frame in an elevated position above the base member; and said ratchet being attachable to an attachment strap of a child safety seat to allow the attachment strap to be tightened by the ratchet as the frame is pushed downward on the child safety seat.

2. The tightening device of claim 1 wherein:

the frame is a trapezoidal-shaped frame.

3. The tightening device of claim 1 wherein:

said at least one ratchet is pivotally attached to said frame.

4. A tightening device for use in installing child safety car seats comprising:

a frame having at least two vertical members extending downward from a top member wherein the top member is in a horizontal position in relation to the at least two vertical members;

at least one ratchet attached to the frame in an elevated position;

said at least two vertical members are notched side members each having notched ends; and said notched ends engage posts that are attachable to a child safety car seat.

5. The tightening device of claim 4 wherein:

said at least one ratchet is pivotally attached to said frame.

6. A tightening device for use in installing child safety car seats comprising:

a frame having a top member connected to a vertical member extending downward to a base member wherein the top member and the base member are both in horizontal positions in relation to the vertical member;

said base member being located directly below said top member;

a ratchet attached to the vertical member in an elevated position above the base member;

said ratchet being attachable to an attachment strap of a child safety seat to allow the attachment strap to be tightened by the ratchet as the frame is pushed downward on the child safety seat; and said ratchet is pivotally attached to the vertical member to allow the ratchet to be angled in relation to the vertical member.

* * * * *